June 25, 1935.  L. EMANUELI  2,006,236
FEEDING RESERVOIR FOR OIL FILLED CABLES
Filed Nov. 24, 1931
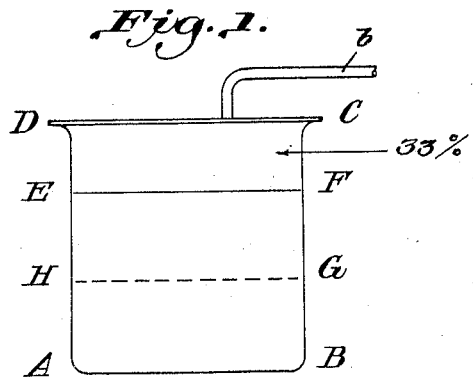
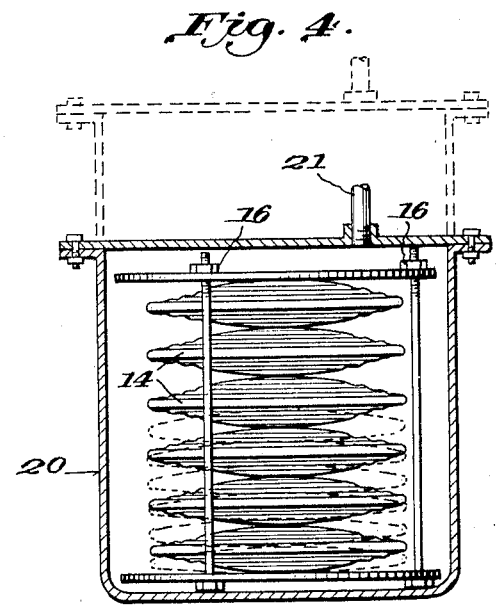
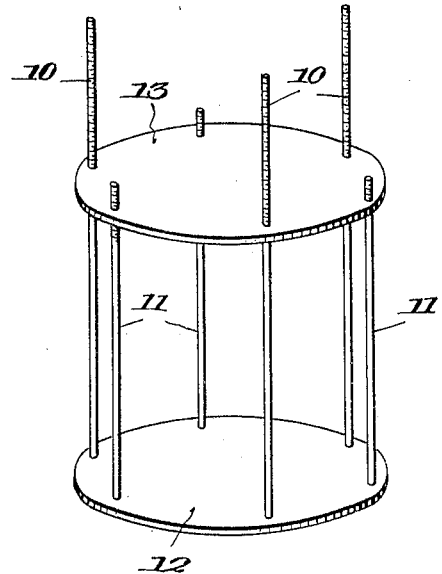
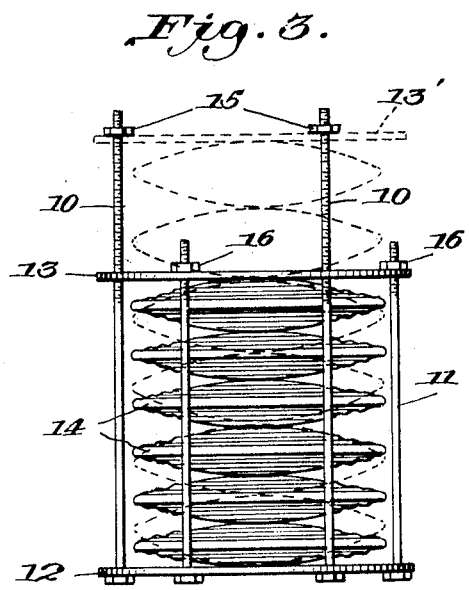
Inventor
Luigi Emanueli,
By Stone, Boyden, Mack & Hahn
Attorneys Patented June 25, 1935

2,006,236

UNITED STATES PATENT OFFICE 2,006,236

FEEDING RESERVOIR FOR OIL FILLED CABLES

Luigi Emanueli, Milan, Italy, assignor to Società Italiana Pirelli, a company of Italy Application November 24, 1931, Serial No. 577,140
In Italy December 10, 1930

2 Claims. (Cl. 137—71)

This invention relates to feeding reservoirs for oil filled cables and has for its principal object to more effectively utilize the whole of the variable capacity of the reservoir and also to reduce the actual volume of a reservoir for the same effective volume.

Various types of cable for the transmission of energy are known which are provided in their interior with one or more channels filled with an insulating fluid under pressure to maintain the cable insulation constantly impregnated. These channels communicate at either the ends of the cable or intermediate points with suitable feeding reservoirs which maintain the impregnating liquid within the cable between predetermined limits of pressure, notwithstanding the temperature variations to which the cable is subjected.

Feeding reservoirs for this purpose may be of the type described in British Patent 267,059. These reservoirs comprise a closed tank in which elastic walled cells filled with air are disposed so that the volume can vary according to the variation of the oil pressure, thus compensating for the corresponding variations in the volume of the oil in the cable.

In the preparation of these reservoirs for installation in the field, the cells are generally filled with air or gas at atmospheric pressure. The minimum pressure of the oil in the cable, corresponding to the lowest foreseeable operating temperature, is always maintained somewhat above atmospheric, thus assuring, in the case of eventual failure of the lead sheath that neither air nor moisture will enter the cable.

Under the above conditions, when the reservoir is connected to the cable for the first time, supposing it to be done at the time the pressure of the oil in the cable is a minimum, a certain definite quantity of oil will flow from the cable to the reservoir. This quantity of oil, after causing a certain compression of the cells, and reducing their volume, afterwards remains constantly in the reservoir like a dead weight and no longer participates in the successive expansions and contractions of the cells due to the variations in the oil pressure in the cables.

The variations of volume which are effectively utilized in the reservoir are therefore less than those corresponding to its size, furthermore there is the inconvenience of having to use in the system a much larger quantity of oil than is strictly necessary.

The present invention has for its object to avoid these inconveniences, by utilizing the whole of the variable capacity of the reservoir to compensate for the variation of the volume of the oil in the cable. In order to accomplish this result, the pressure of the air or other gas in the cells of the reservoir is initially adjusted equal to the minimum pressure which it is estimated will occur in the cable, thereby reducing to a minimum the quantity of oil contained in the reservoir under these conditions. Each subsequent reduction in the volume of the cells serves to compensate for a corresponding increase in the volume of the oil in the cable, due to an increase in temperature.

The invention will be better understood from the following description when considered in connection with the accompanying drawing.

In the accompanying drawing, Fig. 1 is schematic representation of a reservoir partly in section;

Fig. 2 is a perspective of the adjustable cage;

Fig. 3 is an elevation showing the elastic walled cells enclosed in the cage; and Fig. 4 shows an elevation partially in section of the apparatus assembled in the enclosing reservoir.

The following schematic example will serve to explain the above description.

In Fig. 1 ABCD represents the total volume of the cells of a reservoir when the pressure of the contained gas is atmospheric. Assume this volume to represent unity. When the reservoir is placed in communication with the cable by means of the tube or piping $b$, oil will penetrate the reservoir since the minimum pressure of the oil in the cable is always greater than atmospheric. Assuming this absolute minimum pressure to be 1.5 atmospheres, then the total volume ABCD will be reduced to $$\frac{1}{1.5} = 0.67$$

as represented by ABFE, and the portion CDEF will represent the portion of the reservoir permanently filled with oil.

All increases in the pressure of the oil above 1.5 atmospheres, due to increases in the temperature of the cable, will further reduce the total volume of the cells to the minimum represented by ABGH which corresponds to the maximum pressure of the oil in the cable. The variations in the volume of the reservoir actually utilized to compensate for the corresponding variations of the volume of the oil in the cable are therefore represented by the volume HGFE, while the portion EFCD is permanently filled with oil and is therefore not utilized in any manner.

In accordance with this invention, if the gas in the cells is compressed to a pressure of 1.5 atmospheres initially, i. e., before the reservoir is placed in communication with the interior ducts of the cable, the same volume HGFE will be utilized for compensating purposes but the initial volume will be represented by ABFE or 67% of the initial volume where the cells use gas at atmospheric pressure. The same result is obtained with a 33% decrease of total volume of cells and ultimately of the reservoir, thus allowing a smaller and less costly reservoir to replace the larger and more expensive devices used under the old system.

To demonstrate the practical application of the above invention, reference will be had to Figs. 2, 3 and 4.

Fig. 2 gives a perspective view of a cage to be used. The cage consists of heads or discs 12 and 13, the former of which is relatively stationary while the latter is adjustably movable, and a plurality of rods 10 and 11, the alternate series being of different length.

The cells 14 which constitute the variable volume part of the reservoir are first filled with gas at atmospheric pressure and are then hermitically sealed. They are then placed inside the aforementioned cage as shown in Fig. 3 by the extended or dotted position corresponding to the disc 13 in dotted position 13'. This corresponds to the height of the long rods 10. Now in order to obtain the desired super atmospheric pressure the nuts 15 upon the long rods 10 are tightened so as to lower the movable disc 13 until it reaches the position where the short rods 11 project through their corresponding holes in the disc. The nuts 16 are now screwed into position and adjusted so that the compressed cells are held between the discs 12 and 13 by the short rods 11 and contain a pressure of 1.5 atmospheres. The long rods 10 and nuts 15 are now removed and the unit is ready to be installed in a reservoir.

Fig. 4 shows a reservoir tank 20 and its tube or pipe connection 21 for attachment to the cable, containing the cells adjusted for the minimum cable pressure. The tank is reduced in size corresponding to the initial volume ABFE of Fig. 1, thus saving considerable material, making a less costly reservoir. The dotted part of the tank would correspond to a tank of the size needed under the old method of maintaining the cable impregnated. The dotted position of the cells in Fig. 4 corresponds to their compressed condition when the pressure of the oil in the cable is a maximum. This volume would correspond to that indicated by ABGH of Fig. 1.

It is readily seen that the effective compensation is the same as under the old method but the volume of oil and the corresponding volume of the reservoir equal to CDEF of Fig. 1 is saved and the initial cost of the system very materially reduced.

It is obvious that other means may be used and that the drawing is merely illustrative of one practical embodiment.

What I claim is:

1. Apparatus for maintaining pressure in fluid filled high tension electric cables, comprising an enclosed feeding reservoir in communication with a fluid filled cable, a hermetically sealed cell within said reservoir containing an expansible gas and serving to vary the capacity of said reservoir in accordance with the pressure of fluid therein, and a pair of discs having rods therebetween serving normally to compress said cell whereby the gas within said cell is constantly maintained at a pressure greater than atmospheric pressure.

2. Apparatus for maintaining pressure in fluid filled high tension electric cables comprising an enclosed feeding reservoir in communication with a fluid filled cable, a hermetically sealed expansible cell within said reservoir containing a gas and serving to vary the fluid capacity of said reservoir in accordance with the pressure of fluid therein, a pair of discs adapted to engage said cell and adjustable rods connecting said discs whereby said cell may be compressed to a predetermined pressure prior to placement in said reservoir.

LUIGI EMANUELI.